United States Patent [19]

Li et al.

[11] Patent Number: 5,653,953
[45] Date of Patent: Aug. 5, 1997

[54] PROCESS FOR RECOVERING ELEMENTAL SULFUR BY SELECTIVE OXIDATION OF HYDROGEN SULFIDE

[75] Inventors: Kuo-Tseng Li; Min-Ya Huang; Wen-Da Cheng, all of Taichung, Taiwan

[73] Assignee: National Science Council, Taipei, Taiwan

[21] Appl. No.: 521,137

[22] Filed: Aug. 29, 1995

[51] Int. Cl.$^6$ .................................................. C01B 17/02
[52] U.S. Cl. .......................... 423/576.8; 423/224; 423/576
[58] Field of Search ................................ 423/576, 576.8, 423/576.2, 573.1, 224

[56] References Cited

U.S. PATENT DOCUMENTS

| 3,725,531 | 4/1973 | Pearson et al. | 423/526 |
| 4,427,576 | 1/1984 | Dupin | 423/224 |
| 4,605,546 | 8/1986 | Vorin | 423/576.8 |

FOREIGN PATENT DOCUMENTS

| 1102620 | 7/1985 | U.S.S.R. | 423/224 |
| 2025386 | 1/1980 | United Kingdom | 423/224 |

OTHER PUBLICATIONS

J.A. Lagas and J. Borsboom, "Selective-oxidation catalyst improves Claus process", *Oil and Gas Journal*, 86(41), pp. 68–71, (Oct. 10, 1988).

P.F.M.T. van Nisselrooy and J.A. Lagas, "SuperClaus reduces SO$_2$ emission by the use of a new selective oxidation catalyst", *Catalysis Today*, 16, pp. 263–271, 1993.

*Primary Examiner*—Gary P. Straub
*Attorney, Agent, or Firm*—Hitt Chwang & Gaines P.C.

[57] ABSTRACT

The present invention discloses a method of selectively oxidizing hydrogen sulfide to elemental sulfur, in which a H$_2$S-containing gas mixture contacts with an oxygen-containing gas at 50°–500° C. in the presence of a mixed-metal catalyst. The reaction product mixture contains substantially no sulfur dioxide. The mixed-metal catalyst contains vanadium atom and molybdenum atom or magnesium atom.

6 Claims, No Drawings

PROCESS FOR RECOVERING ELEMENTAL SULFUR BY SELECTIVE OXIDATION OF HYDROGEN SULFIDE

FIELD OF THE INVENTION

The present invention relates to a process for recovering elemental sulfur by selectively oxidizing hydrogen sulfide to elemental sulfur, and in particular to a novel catalyst used therein.

BACKGROUND OF THE INVENTION

In the petroleum refinery processes for producing various fuel oils such as gasoline, diesel and kerosene, etc., the sulfur contained are the crude oils is removed as hydrogen sulfide gas by hydrodesulfurization process. The highly toxic hydrogen sulfide gas is then converted to elemental sulfur in sulfur-recovery plants or so-called Claus plants. The Claus plants can be blamed for part of the hydrogen sulfide emissions, as the sulfur-recovery rate is 90–98% depending on the number of reactors used therein. During the last two decades a great number of Claus tail-gas treating (TGT) processes have been developed to increase the total sulfur-recovery efficiency. Conventional Claus TGT processes involve a hydrogen sulfide absorption step, in which a tail gas containing unreacted hydrogen sulfide is introduced into an alkaline bath. Removing the last percentages of sulfur by means of these conventional Claus TGT processes is expensive, both in terms of capital investment cost and energy consumption. In order to avoid the shortcoming of these solution-absorption type Claus TGT processes, a dry type Claus TGT process has been developed in Netherlands which comprises recovering elemental sulfur from the Claus tail gas by selective oxidation of hydrogen sulfide in the presence of a catalytically active mixture of iron and chromium oxides deposited on an alpha-alumina support [Oil and Gas Journal, 86(41), p. 68–71, (Oct. 10, 1988); Catalysis Today, 16, p. 263–271, 1993]. The dry type Claus TGT process is simple and economical; however, the chromium atom contained in the catalyst is a toxic substance.

The primary objective of the present process is to provide a process for recovering elemental sulfur from a gas mixture containing hydrogen sulfide by selective oxidation of hydrogen sulfide in the presence of a catalyst comprising vanadium and magnesium or molybdenum atoms.

DETAILED DESCRIPTION OF THE INVENTION

The possible reactions between hydrogen sulfide and oxygen are as follows:

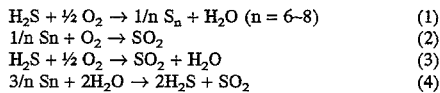

| | |
|---|---|
| $H_2S + \frac{1}{2} O_2 \rightarrow 1/n\ S_n + H_2O$ (n = 6–8) | (1) |
| $1/n\ Sn + O_2 \rightarrow SO_2$ | (2) |
| $H_2S + \frac{3}{2} O_2 \rightarrow SO_2 + H_2O$ | (3) |
| $3/n\ Sn + 2H_2O \rightarrow 2H_2S + SO_2$ | (4) |

In the presence of an appropriate catalyst, such as the iron/chromium oxides used in the prior art [Oil and Gas Journal, 86(41), p. 68–71, (Oct. 10, 1988); Catalysis Today, 16, p. 263–271, 1993], the reaction (1) will take place while the reactions (2) to (4) are inhibited, i.e. the hydrogen sulfide is selectively oxidized to elemental sulfur, wherein the hydrogen sulfide is converted with a high selectivity into elemental sulfur, while the formation of sulfur dioxide ($SO_2$) is very small even in the presence of an overstoichmetric amount of oxygen.

The present invention discloses a novel catalyst suitable for selective oxidation of hydrogen sulfide to elemental sulfur, and said novel catalyst is a mixed-metal catalyst which comprises vanadium atom and magnesium atom or molybdenum atom.

The present invention also discloses a process for recovering elemental sulfur from a gas mixture containing hydrogen sulfide, which comprises contacting said gas mixture with an oxygen-containing gas at an elevated temperature in the present of a catalyst, wherein the improvement comprises said catalyst is a mixed-metal catalyst comprising vanadium atom and magnesium atom or molybdenum atom.

Preferably, said mixed-metal catalyst has a molar ratio of vanadium atom to magnesium or molybdenum atom ranging from 1:100 to 100:1, preferably 1:10 to 10:1.

The mixed-metal catalyst used in the present process may be a metal, metal oxide, metal sulfide, or metal salt, which can be in the form of monolith, particle or pellet, or deposited on a porous carrier selected from the group consisting of alumina, silica and zeolite.

Said elevated temperature of the present process ranges from 50° C. to 400° C., preferably from 100° C. to 350° C.

Pressure has no significant effect on the present process. A suitable pressure for contacting said gas mixture with said oxygen-containing gas in the present process is about 1–10 atm.

Said oxygen-containing gas used in the present process includes (but not limited to) air, oxygen-enriched air, and pure oxygen. Preferably air is used as the oxygen-containing gas.

Said gas mixture containing hydrogen sulfide used in the present process has no limitation on the hydrogen sulfide concentration. However, in the SuperClaus-99 process the hydrogen sulfide concentration contained in the tail gas is controlled at 0.8–3 vol % [Oil and Gas Journal, 86(41), p. 68–71, (Oct. 10, 1988); Catalysis Today, 16, p. 263–271, 1993].

The stoichmetric ratio of hydrogen sulfide to oxygen in the reaction (1) is 2:1. Preferably, in the present process said gas mixture is contacted with said oxygen-containing gas with a molar ratio of hydrogen sulfide to oxygen less than 2, i.e. with an overstoichmetric amount of oxygen.

The invention will be further illustrated by the following examples. The following examples are only meant to illustrate the invention, but not to limit it.

EXAMPLES

Preparation of catalysts:

Control Example 1: Molybdenum Oxide

To 25 ml of distilled water 12.35 g (0.01 mole) of ammonium molybdate [$(NH_4)_6Mo_7O_{24} \cdot 4H_2O$, manufactured by Riedel-de Haën, Germany], and then nitric acid was added to the resulting solution to maintain the pH value thereof at 1.5 and to yield a Mo metal salt precipitation therein. The solution/precipitation mixture was kept in room for 24 hours, and the precipitation was removed by filtration, and dried at 150° C. for 4 hours. Finally the dried precipitation was calcined at 400° C. for 8 hours to obtain molybdenum oxide catalyst.

Control Example 2: Vanadium Oxide

Ammonium vanadate powder [$NH_4VO_3$ purchased from Showa Chemicals, Inc., Japan] was calcined at 550° C. for 3 fours to form orange powder which was then pressed and screened to obtain particles of 10–20 mesh number.

Control Example 3: Magnesium Oxide 64.1 g (0.25 mole) magnesium nitrate [$Mg(NO_3)_2 \cdot 6H_2O$, manufactured by Janssen Chimica, Belgium] together with 24.02 g (0.25 mole) ammonium carbonate [$(NH_4)_2CO_3$, available from Fisher Scientific Co., U.S.] were added to 30 ml distilled water while stirring. White solid was precipitated in the mixture and removed therefrom by filtration. The precipitation was washed with 60 ml distilled water for five times, then dried at 80° C. for 12 hours, and finally calcined at 700° C. for three hours to give magnesium oxide in the form of white powder.

Example 1: Vanadium and Molybdenum Mixed-Oxide Catalyst (a) 3.531 g (0.00286 mole) ammonium molybdate and 4.6792 g (0.04 mole) ammonium vanadate were dissolved in 80 ml distilled water (80° C.).

(b) 40 ml of 0.1N aqueous oxalic acid solution was added to the solution of step (a) while stirring, in which the temperature was maintained at 80° C. The stir was continued until a precipitation paste was formed in the mixture.

(c) The precipitation paste was removed from the mixture and dried under vacuum at 80° C. for 6 hours, and calcined at 550° C. for 6 hours to yield a mixture of vanadium and molybdenum oxides having a molar ratio of V:Mo=2:1.

The steps (a)–(d) were repeated to yield a mixture of vanadium and molybdenum oxides having molar ratio of V:Mo=1:1 except that the amount of ammonium molybdate or ammonium vanadate was changed.

Example 2: Vanadium and Magnesium Mixed-Oxide Catalyst (a) 64.1 g (0.25 mole) magnesium nitrate [$Mg(NO_3)_2 \cdot 6H_2O$, manufactured by Janssen Chimica, Belgium] together with 24.02 g (0.25 mole) ammonium carbonate [$(NH_4)_2CO_3$, available from Fisher Scientific Co., U.S.] were added to 30 ml distilled water while stirring. White solid was precipitated in the mixture and removed therefrom by filtration. The precipitation was washed with 60 ml distilled water for five times, then dried at 80° C. for 12 hours, and finally calcined at 700° C. for three hours to give magnesium oxide in the form of white powder. (b) 4 g (0.0342 mole) ammonium vanadate was dissolved if 100 ml distilled water with heating and stirring. To the resulting solution 4 g of the magnesium oxide prepared above was added, in which the temperature was maintained and the stir was continued until a precipitation paste was formed in the mixture. The precipitation paste was removed from the mixture and dried at 80° C. for 12 hours, and calcined at 580° C. for 6 hours to yield a mixture of vanadium and magnesium oxides having a molar ratio of V:Mg=3:1.

Example 3: Vanadium and Magnesium Mixed-Oxide Catalyst Deposited on Silica (a) 2 g (0.0171 mole) ammonium vanadate was added to 50 ml distilled water, and the undissolved residue was removed to obtain a saturated solution. 22.89 g of dried silica particles (mesh number 14–16, purchased from Strem Chemicals, U.S.) were impregnated in the saturated solution for 24 hours. The impregnated silica particles were removed from the saturated solution and then dried at 100° C. for 6 hours.

(b) To a solution of 20 g (0.25 mole) magnesium nitrate in 50 ml distilled water 25 g of the dried impregnated silica particles prepared in step (a) was added. The particles were removed from the resulting mixture after they were impregnated in the magnesium nitrate aqueous solution for 24 hours. The impregnated particles was dried at 100° C. for 6 hours to yield 32.16 g dried impregnated particles followed by 6 hours calcination at 550° C. to give 25.6 g catalyst.

Selective oxidation of hydrogen sulfide

Example 4

A continuous fixed bed reactor having an inner diameter of 7 mm, an outer diameter of 9 mm and a length of 80 cm was used in this example. Catalyst in the form of 10–20 mesh number particles was packed into the reactor, in which quartz sand was filled at the feed end of the catalyst bed to form a preheating zone. The reaction temperature was controlled by electrical heaters installed around the reactor. The catalyst bed was presulfurized for 12 hours or longer by introducing a high concentration hydrogen sulfide gas mixture into the reactor at an elevated temperature until a gaseous reaction product leaving the reactor had a stable hydrogen sulfide concentration. A gaseous feed stream consisting of 1 vol % hydrogen sulfide, 5 vol % oxygen and 94 vol % nitrogen was then introduced into the reactor at 100 or 200 ml/min. The reaction product exiting the reactor was introduced into a gas-solid separator which was maintained at 25° C., in which the reaction product was separated into a solid product and a gaseous product. The composition of the gaseous product was analyzed by a HP5890 gas chromatography with a 9 feet long Porapak Q80/100 mesh S.S. coiled column.

The reaction conditions and results are listed in Tables 1–6, in which the conversion (%) is defined as the mole of hydrogen sulfide reacted per mole of hydrogen sulfide in the feed stream, and the selectivity is defined as the mole of elemental sulfur formed per mole of the reacted hydrogen sulfide, which can be calculated as follows:

$$\text{Conversion}(\%) = \frac{H_2S \text{ feeding rate (mole/min.)} - H_2S \text{ exiting rate (mole/min.)}}{H_2S \text{ feeding rate (mole/min.)}} \times 100\%$$

$$\text{Selectivity}(\%) = \frac{\text{elemental sulur formation rate (mole/min.)}}{H_2S \text{ feeding rate (mole/min.)} - H_2S \text{ exiting rate (mole/min.)}} \times 100\%$$

The elemental sulfur formation rate (mole/min.) is equal to the hydrogen sulfide feeding rate (mole/min.) subtracts the exiting rate (mole/min.) of hydrogen sulfide and subtracts the exiting rate (mole/min.) of sulfur dioxide in the gas product.

TABLE 1

Molybdenum oxide catalyst prepared in the Control Example 1 (amount of catalyst used: 2 g; feed stream rate: 100 ml/min.)

| Temperature (°C.) | Conversion (%) | Selectivity (%) |
| --- | --- | --- |
| 190 | 9.6 | 100 |
| 200 | 10.4 | 100 |
| 210 | 11.6 | 100 |
| 220 | 17.1 | 100 |
| 240 | 23.0 | 100 |
| 250 | 28.4 | 100 |

TABLE 1-continued

Molybdenum oxide catalyst prepared in the Control Example 1
(amount of catalyst used: 2 g; feed stream rate: 100 ml/min.)

| Temperature (°C.) | Conversion (%) | Selectivity (%) |
| --- | --- | --- |
| 260 | 38.5 | 83.6 |
| 270 | 61.5 | 55 |

TABLE 2

Vanadium oxide catalyst prepared in the Control Example 2

| Temperature (°C.) | Conversion (%) | Selectivity (%) |
| --- | --- | --- |
| a) amount of catalyst used: 0.5 g; feed stream rate: 100 ml/min. | | |
| 200 | 76 | 100 |
| 210 | 78 | 100 |
| 220 | 81 | 88 |
| b) amount of catalyst used: 0.2 g; feed stream rate: 200 ml/min. | | |
| 200 | 49 | 100 |
| 220 | 53 | 100 |
| 240 | 58 | 100 |
| 260 | 68 | 95 |

TABLE 3

Magnesium oxide catalyst prepared in the Control Example 3
(amount of catalyst used: 0.5 g; feed stream rate: 100 ml/min.)

| Temperature (°C.) | Conversion (%) | Selectivity (%) |
| --- | --- | --- |
| 200 | 5.46 | 100 |
| 210 | 8.65 | 100 |
| 220 | 10.43 | 100 |
| 230 | 12.52 | 100 |
| 290 | 41.85 | 100 |
| 300 | 48.11 | 100 |

TABLE 4

Vanadium and molybdenum mixed-oxide catalyst prepared in the Example 1
(amount of catalyst used: 0.2 g; feed stream rate: 200 ml/min.)

| Temperature (°C.) | Conversion (%) | Selectivity (%) |
| --- | --- | --- |
| V:Mo = 2:1 | | |
| 200 | 80 | 99 |
| 220 | 87 | 83 |
| V:Mo = 1:1 | | |
| 220 | 61 | 100 |
| 240 | 76 | 100 |
| 260 | 82 | 83 |

TABLE 5

Vanadium and magnesium mixed-oxide catalyst prepared in the Example 2
(amount of catalyst used: 0.5 g; feed stream rate: 100 ml/min.)

| Temperature (°C.) | Conversion (%) | Selectivity (%) |
| --- | --- | --- |
| 200 | 80.34 | 100 |
| 210 | 87.74 | 100 |

TABLE 5-continued

Vanadium and magnesium mixed-oxide catalyst prepared in the Example 2
(amount of catalyst used: 0.5 g; feed stream rate: 100 ml/min.)

| Temperature (°C.) | Conversion (%) | Selectivity (%) |
| --- | --- | --- |
| 220 | 90.67 | 100 |
| 230 | 95.09 | 84 |

TABLE 6

Vanadium and magnesium mixed-oxide catalyst deposited on silica prepared in the Example 3
(amount of catalyst used: 0.5 g; feed stream rate: 100 ml/min.)

| Temperature (°C.) | Conversion (%) | Selectivity (%) |
| --- | --- | --- |
| 200 | 81.8 | 100 |
| 210 | 95.53 | 100 |

Comparing the data of Table 4 with Table 1 and Table 2b), it can be seen that the mixed-metal catalyst containing vanadium and molybdenum oxides has significantly higher conversion and selectivity for the selective oxidation reaction of $H_2S$ than those of the vanadium oxide catalyst and of the molybdenum oxide catalyst. The data in Tables 2a), 3 and 5 also show that the mixed-metal catalyst containing vanadium and magnesium oxides has better performances for the selective oxidation reaction of $H_2S$ in comparison with the catalysts containing only one metal oxide, vanadium oxide or magnesium oxide. The results indicate that the incorporation of molybdenum oxide or magnesium oxide to vanadium oxide has synergistic catalytical effects for the selective oxidation reaction of $H_2S$ to elemental sulfur.

What is claimed is:

1. A process for selectively oxidizing hydrogen sulfide to elemental sulfur from a gas mixture containing from about 0.8 to about 3 volume percent of said hydrogen sulfide, said process consisting essentially of the steps of:

forming a solution of vanadium and molybdenum salts;
precipitating said solution with an acid solution to obtain a precipitate having a ratio of vanadium to molybdenum of about 1 to about 2;
separating and calcinating said precipitate to the corresponding oxides;
presulfurizing said corresponding oxides; and
contacting said presulfurized oxides with said gas mixture in the presence of a gaseous feed stream containing an overstoichmetric amount of oxygen up to an oxygen to hydrogen sulfide molar ratio of up to 5 to 1 at a temperature off from about 100° C. to about 260° C.

2. A process according to claim 1 wherein said presulfurized oxides are in the form of monolith or particle.

3. A process according to claim 1 wherein said solution of vanadium and molybdenum is deposited on a porous carrier sheeted from the group consisting of alumina, silica and zeolite.

4. A process for selectively oxidizing hydrogen sulfide to elemental sulfur from a gas mixture containing from about 0.8 to about 3 volume percent of said hydrogen sulfide, said process consisting essentially of the steps of:

calcinating a precipitate of a magnesium salt to give a calcinated magnesium oxide;

precipitating a solution of a vanadium salt with said calcinated magnesium oxide to obtain a precipitate having vanadium and magnesium in a molar ratio of about 3 to 1;

separating and calcinating said precipitate to the corresponding oxides;

presulfurizing said corresponding oxides; and contacting said presulfurized oxides with said gas mixture in the presence of a gaseous feed stream containing an overstoichmetric amount of oxygen up to an oxygen to hydrogen sulfide molar ration of up to 5 to 1 at a temperature of from about 100° C. to about 260° C.

5. A process according to claim 4 wherein said presulfurized oxides are in the form of monolith or particle.

6. A process according to claim 4 wherein said solution of said vanadium salt with said calcinated magnesium oxide is deposited on a porous carrier selected from the group consisting of alumina, silica and zeolite.

* * * * *

UNITED STATES PATENT AND TRADEMARK OFFICE
CERTIFICATE OF CORRECTION

PATENT NO. : 5,653,953
DATED : August 5, 1997
INVENTOR(S) : Li et al.

It is certified that error appears in the above-indentified patent and that said Letters Patent is hereby corrected as shown below:

Col. 1, line 15, "are" should be --in--;

Col. 3, line 1, "fours" should be --hours--;

Col. 6, line 54, "off" should be --of--;

Col. 6, line 59, "sheeted" should be --selected--; and

Col. 8, line 1, "ration" should be --ratio--.

Signed and Sealed this

Twenty-first Day of October 1997

Attest:

BRUCE LEHMAN

Attesting Officer

Commissioner of Patents and Trademarks